(12) United States Patent
Bacher et al.

(10) Patent No.: US 7,267,234 B2
(45) Date of Patent: Sep. 11, 2007

(54) BACKFLUSHABLE FILTER DEVICE FOR MOLTEN MATERIAL AND DISTRIBUTION UNIT FOR A FILTER DEVICE OF THIS TYPE

(75) Inventors: Helmut Bacher, St. Florian (AT); Helmuth Schulz, Linz (AT); Georg Wendelin, Linz (AT); Wolfgang Dreu, Linz (AT)

(73) Assignee: EREMA Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 374 days.

(21) Appl. No.: 10/525,884

(22) PCT Filed: Oct. 27, 2003

(86) PCT No.: PCT/AT03/00322

§ 371 (c)(1),
(2), (4) Date: Feb. 24, 2005

(87) PCT Pub. No.: WO2004/037514

PCT Pub. Date: May 6, 2004

(65) Prior Publication Data

US 2006/0163145 A1    Jul. 27, 2006

(30) Foreign Application Priority Data

Oct. 28, 2002  (AT) ............................. A 1629/2002

(51) Int. Cl.
*B01D 35/12* (2006.01)
*B01D 29/62* (2006.01)
*B29C 47/68* (2006.01)

(52) U.S. Cl. ...................... 210/411; 210/425; 210/236; 425/197; 425/199

(58) Field of Classification Search ................ 210/411, 210/425, 236; 425/197, 199
See application file for complete search history.

(56) References Cited

U.S. PATENT DOCUMENTS 3,243,849 A * 4/1966 Jonkainen .................... 210/340
3,896,029 A * 7/1975 Beuselinck ................. 210/341
6,325,217 B1 * 12/2001 Hehenberger et al. ...... 210/411
6,422,852 B1 * 7/2002 Kreyenborg et al. ........ 425/197

FOREIGN PATENT DOCUMENTS

DE       19730574 C1    4/1998
DE       10056557 A1    5/2001
EP        1245366 A2   10/2002

* cited by examiner

*Primary Examiner*—Thomas M. Lithgow
(74) *Attorney, Agent, or Firm*—Townsend and Townsend and Crew, LLP

(57) ABSTRACT

A backflushable filtering apparatus for a molten material, particularly for a plastic melt, comprises a housing (1) in which a sieving arrangement (17) is provided which includes at least two sieving sections (16) separated from one another. The melt to be filtered is supplied to the sieving sections (16) through at least one distributor (3). The distributor (3) includes at least one control body (9) for backflushing which is moveable within a housing (53) that is provided with an inlet opening (4) for the material to be filtered. The control body (9), in a filtering position, unblocks the influx of material to be filtered to all sieving sections (16) through connection channels (23). However, in a backflushing position, the control body (9) interrupts the influx of material to the filtering section (16) to be backflushed and interconnects the connection channel (23) of the sieving section (16) flushed back with a discharge channel (28) located in the control body (9). At least the majority of the circumference of the control body (9) is surrounded by a distribution space (7) for the material to be filtered which is situated within its housing (53). The distribution space (7)

is connectable through the connection channels (23) to all sieving sections (16) in communication with the distributor (3). Guiding channels (6) lead from the inlet opening (4) to the regions of the two front ends (61, 62) of the distribution space (7). These front ends (61, 62) are situated in the region of the outermost connection channels (23) or outside the region of all connection channels (23). The discharge channel (28), which leads away from the control body (9), may be caused to communicate with the connection channel (23) of the respective sieving section (16) to be flushed back through a flush back channel (27) of at least one cross-piece (14) of the control body (9) which overbridges the distribution space (7).

21 Claims, 11 Drawing Sheets

BACKFLUSHABLE FILTER DEVICE FOR MOLTEN MATERIAL AND DISTRIBUTION UNIT FOR A FILTER DEVICE OF THIS TYPE

The invention relates to a backflushable filtering apparatus for a molten material, particularly for a plastic melt, comprising a housing in which a sieving arrangement is provided which includes at least two sieving sections separated from one another, to which the melt to be filtered is supplied via at least one distributor which includes at least one control body for backflushing, moveable within a housing that is provided with an inlet opening for the material to be filtered, said control body, in a filtering position, unblocking the influx of material to be filtered to all sieving sections through connection channels, while in a backflushing position interrupting the influx of material to the filtering section to be backflushed and interconnecting the connection channel of the sieving section flushed back with a discharge channel located in the control body and leading away from it, at least the majority of the circumference of the control body being surrounded by a distribution space for the material to be filtered which is situated within the housing of the distributor, said distribution space being connectable through the connection channels to all sieving sections in communication with the distributor. Furthermore, the invention relates to a distributor for such a filtering apparatus.

A filter apparatus of the initially described kind which can be back-flushed, has become known (EP 1245366 A2, DE 19730574 C1). Within these constructions, the control body is constituted by a control piston that can be shifted within its housing in longitudinal direction and has a central peripheral groove which is in flow connection with the inlet opening and via which the material to be filtered is supplied either to two piston-shaped sieve carriers or, if it has to be back-flushed, only to one of these sieve carriers. In the back-flushing position a conduit that leads to the central discharge channel of the control body is in connection with the downstream side of the back-flushed sieve. Within this, the expenditure caused by two separated sieve carrier pistons is of disadvantage as well as the reason that such a construction is limited to only two sieves. Further, material to be filtered may stay for a longer time within the peripheral groove of the control body so that there is the danger of coking of this material.

Within another back-flushable filter apparatus (AT 407611 B), the control-body is constituted by a rotatable piston bearingly supported for rotation within its housing, which piston is intersected crosswise to its axis by two radial through-passage conduits which in the filtering position connect the inlet opening with two sieve section of the sieving arrangement. Each one of these sieve sections is formed by a filter element disposed within the housing of the filter device. By rotation of the rotational piston around its longitudinal axis one of the two through-passage conduits can be so rotated that the flow of the material to be filtered to the associated filter is blocked, however this filter which has to be back-flushed is connected with a discharge channel for impurities which have to be carried off the back-flushed filter, which discharge channel is disposed within the rotatable piston. Within this, it is of disadvantage within the temporary blocking of the supply conduit during the backflushing process that the material positioned within the conducting conduit leading from the inlet opening to the rotatable piston stands still and therefore tends to coking. Further, it is difficult to extend such a filter apparatus to more than two sieve sections.

It is an object of the invention to improve a filtering apparatus of the kind mentioned at the outset so that a continuous flow through all channels is ensured which lead to the sieving sections during the filtering procedure, thus avoiding coking of the material to be filtered, on the one hand, while the apparatus may be enlarged to any number of sieving sections desired without any problem, on the other hand. This object is achieved according to the invention in that guiding channels lead from the inlet opening to the regions of the two front ends of the distribution space, that said front ends are situated in the region of the outermost connection channels or outside the region of all connection channels, and that the discharge channel may be caused to communicate with the connection channel of the respective sieving section to be flushed back through a flush back channel of at least one cross-piece of the control body which overbridges the distribution space. In this way, the flow to the connection channels is always directed from the exterior to the middle so that no dead corners will exist in which plastic material could remain during the filtering procedure, thus affecting its quality. A distribution space with such a flow will continuously be flown through by the material to be filtered, independently of whether a sieving section is just backflushed or not.

By arranging a plurality of cross-pieces off-set relative to each other, this construction may be enlarged to a high number of sieving section without any problem, nevertheless always ensuring backflushing section by sections. It is also advantageous that the sieving section flushed back has not necessarily to be moved during flushing back procedure so that a sieve carrier, commonly used for holding a sieving section, does not wear off by the back flushing procedure. The sieve carrier, being stationary during backflushing procedure, will therefore not introduce burnt or decomposed parts of melt into the melt that has already been filtered. Moreover, the apparatus may also be operated in an easier manner, because, by simply moving the control body into a position different from the previous position, one sieve section after the other may be blocked against the flow of melt, while concurrently connecting it with the discharge channel, independently of the number of existing sieving sections.

Within the scope of the constructive possibilities of realization, there are two basic variants: the control body may be a slider displaceable in the housing, that surrounds it, the connection channels leading to the individual sieving sections being offset relative to each other in sliding direction of the slider, on the one hand. On the other hand, the control body may be a rotary piston, rotatable about its longitudinal axis within its housing, which is supported in a sealed manner at its two front ends in its housing, but is surrounded in-between by the distribution space. Though the former construction requires more space due to the longitudinal sliding motion of the slider, it is theoretically unlimited with respect to the number of sieving sections, while the latter construction is more space-saving.

According to a preferred embodiment of the invention, a particularly advantageous construction consists in that the connection channels extend only in the housing, which surrounds the control body, and that sieve nests of the housing of the filtering apparatus, which contain the sieving sections, immediately join the outer surface of the housing of the control body within the region of the respective orifice of a connection channel. This results in a very short path between the distribution space and the individual sieving sections. The consequence is that, having terminated the backflushing procedure, the dirty flush back mass existing in the above-mentioned path is as small as possible, thus not affecting substantially the filter function of the corresponding sieving section in the following filtering procedure.

It is especially favorable if, according to the invention, the sieving arrangement comprises a plurality of sieving sections arranged in at least one array, the orientation of which being parallel to the longitudinal direction of the distribution space. These numerous sieving sections separated from one another can each separately be flushed back, and, in the case of a suitable arrangement, can be flowed through centrally in relation to the connection channels, and therefore also can centrally be flushed back, which enhances the efficiency both of the filtering performance and of backflushing.

It is convenient to form each sieving station with a perforated support plate and a perforated backflushing plate, at least one sieving layer being situated in-between. Both plates, as mentioned above, support the sieving layer during filtering procedure and the backflushing procedure, and prevent in this way any deformation of the sieving layer. Such a construction can easily be formed in such a manner that at least one sieving section is separated from the adjacent sieving section by a partition arranged upstream in filtering position, and a connection channel leads to each one of the sieving sections. This results in an increase of the number of sieving sections being independent from one another, and therefore an improvement of the entire filtering performance. The perforated support plate and the perforated backflushing plate may be made arcuate, the convex side being upstream in filtering position. This results in an enlargement of the sieving surface, and the resulting sieving space corresponds better to the occurring flow conditions. At least one sieving section may comprise a rectangular or square sieving surface, optionally with rounded corners, which results in an increase of the active filtering surface that is flown through in a uniform manner.

In order to favour splitting up the supplied melt fluid to centrally disposed sieving sections, at least one additional conducting conduit may end in the distribution space between the two conducting conduits leading to the front ends of the distribution space.

Further, it is possible to provide at least two control bodies within a common housing, each one of which is supplied in the region of the front ends of its distribution space via conducting channels. This may contribute to enhance the uniformity of supplying the sieving sections. Further, this facilitates the common backflushing of more than one sieving section. Further, thereby the backflushing distances for the screened-off impurity particles to be backflushed are made even shorter, and the material demand for backflushing is decreased.

The distributor for a backflushable filtering apparatus according to the invention is based on a construction which comprises a housing and a control body for backflushing moveable therein, to which the material to be filtered is supplied through an inlet opening and which, in filtering position, unblocks the influx of this material to at least two connection channels which may be interconnected to sieving sections of the filtering apparatus, whereas in a flush back position, the control body interconnects one of these connection channels with a discharge channel situated in the control body, the inlet opening communicating with a distribution space arranged in the housing and whose majority surrounds the control body. On this base, the construction according to the invention of this distributor is characterized in that the inlet opening communicates with the distribution space via two guiding channels which discharge at its front end into the distribution space within the region of the outermost connection channels or outside the region of all connection channels. As has been mentioned above, this results in the advantage that the flow to the connection channels is always directed from the exterior to the middle, and dead corners are avoided in which material to be filtered could remain for a long period.

At least one additional conducting conduit may lead to the distribution space between the two conducting channels leading to the front ends of the distribution space.

Further characteristics and advantages of the invention will become apparent from the description of embodiments schematically illustrated in the drawings.

Figure 1:
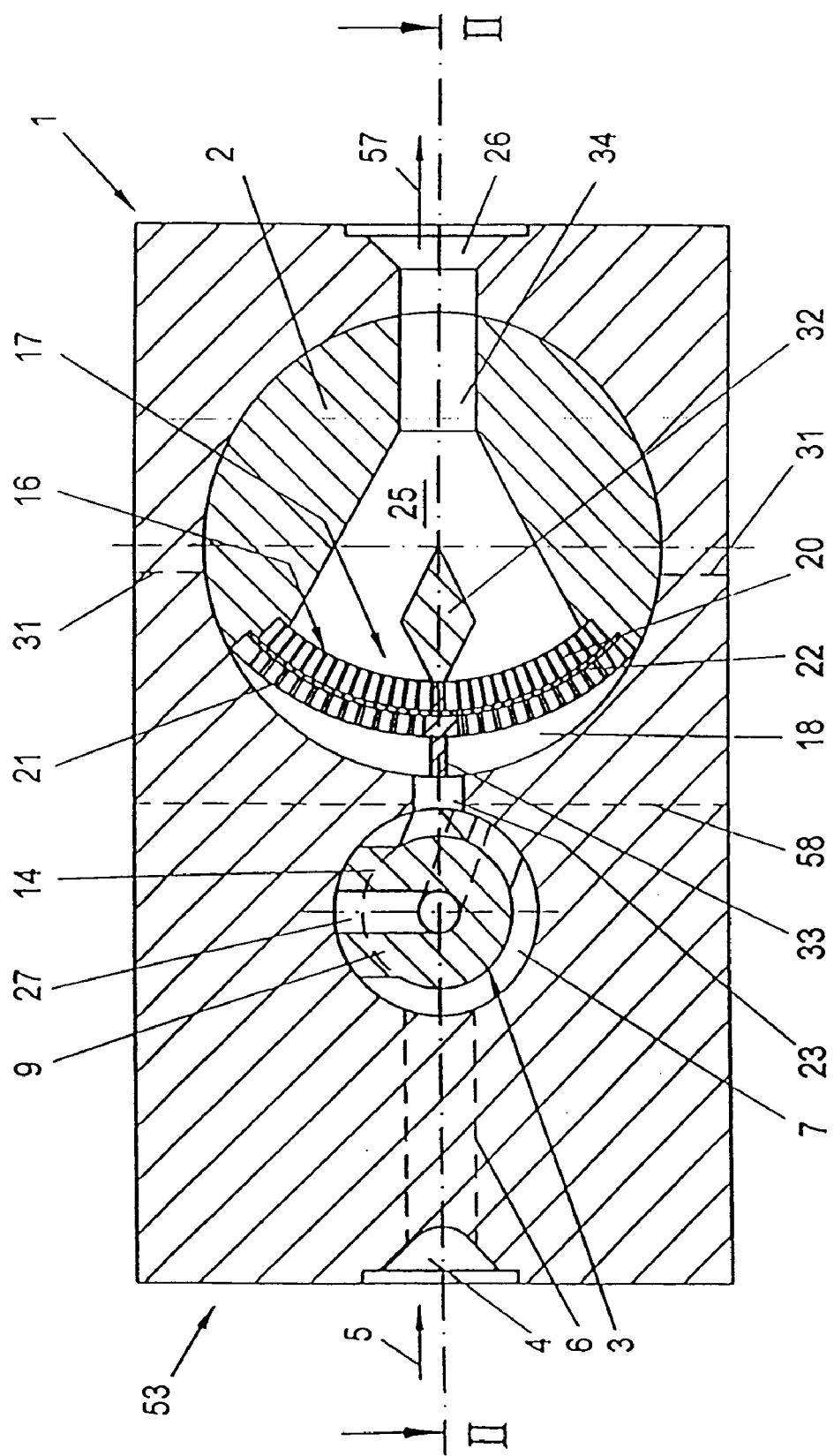
FIG. 1 shows a cross-section of a first embodiment having a single distributor formed as a rotary piston.
Figure 2:
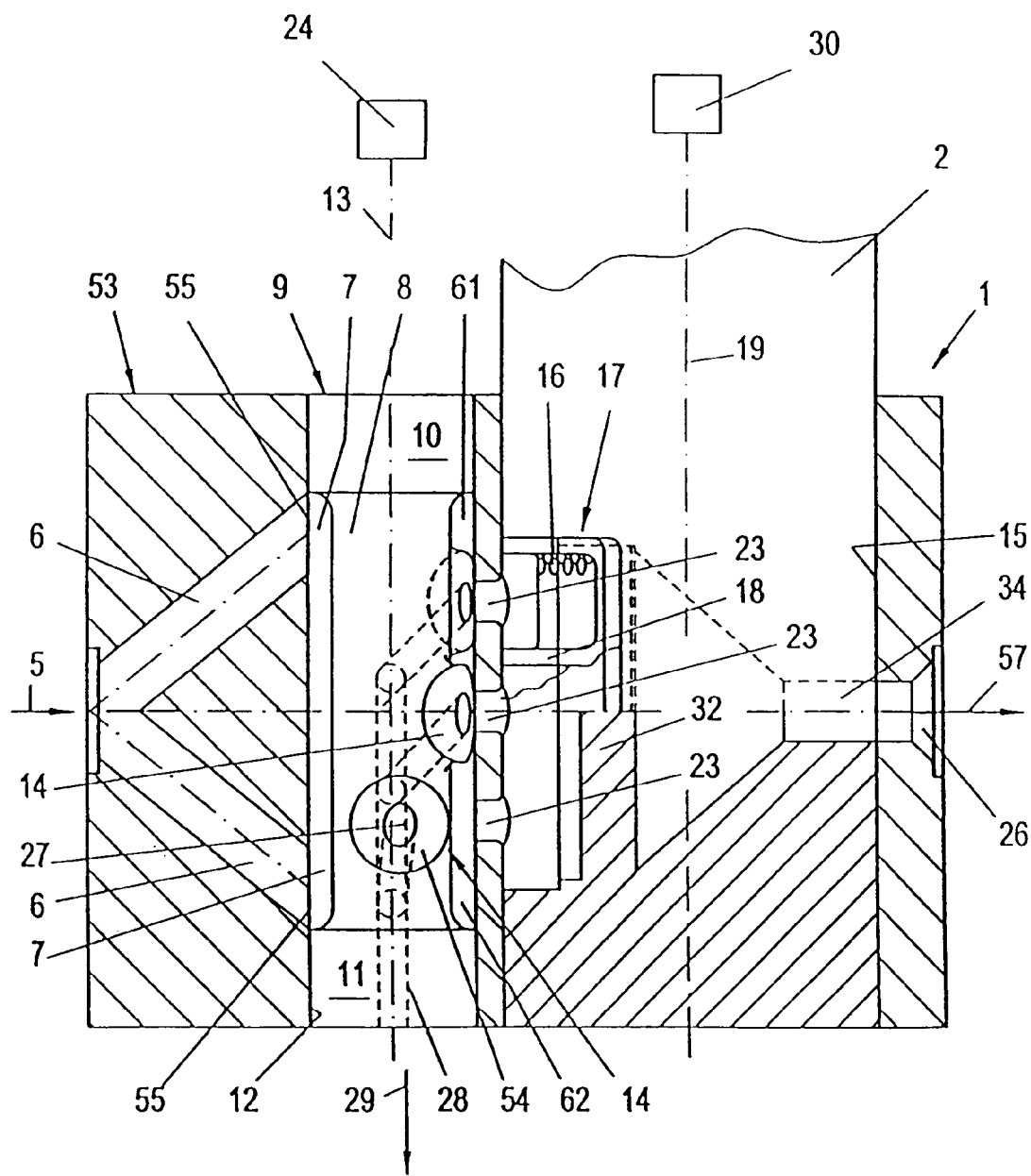
FIG. 2 is a cross-section along the line II-II of FIG. 1.

The embodiment of FIGS. 1 and 2 comprises a housing 1 for a sieve carrier 2 as well as a housing 53 for a distributor 3 associated to it. The housing 53 comprises an inlet opening 4 for the influx of a melt to be filtered which is particularly formed by a molten thermoplastic material. The material flowing in the direction of arrow 5 into the inlet opening 4 reaches two guide channels 6 leading to both front ends of a distribution space 7 which surrounds the majority of the circumference of a control body 9 of the distributor 3 formed as a rotary piston 8. This distribution space 7, at both its front ends 61, 62, is closed by cylindrical portions 10, 11 of the rotary piston 8 with which the rotary piston 8 is supported in a borehole 12 of the housing 1 so as to be rotatable about its longitudinal axis, but sealed. The control body 9 comprises between the two cylindrical portions 10, 11 a plurality of cross-pieces 14 extending through the distribution space 7 which are offset relative to each other in circumferential direction of the distribution space, each of which being formed by a knob-like salient 54 of the outer surface of the control body 9. The surface of each cross-piece 14 or of the salient 54 forming it which faces the wall of the borehole 12 is adapted to the shape of the borehole 12 so that the cross-piece 14 sealingly engages an area of the wall of the borehole 12.

The sieve carrier 2 is formed as a cylindrical piston arranged in a borehole 15 of the housing 1. At the side facing the distributor 3, the sieve carrier 2 carries a plurality of sieving sections 16 arranged side-by-side in its longitudinal direction, a single one of them being represented in FIG. 2 for the sake of simplicity. These sieving sections 16 together form a sieving arrangement 17 for filtering the material supplied to it. The individual sieving sections 16 are separated from one another by partitions 18 arranged upstream of each sieving arrangement 17 and extending substantially perpendicularly to the longitudinal axis 19 of the sieve carrier 2. Each sieving section 16 comprises a perforated support plate 20 arranged downstream during filtering procedure, and a perforated backflushing plate 21 arranged upstream. Between the two plates 20, 21 is a sieving layer 22 which exerts the real filtering effect. The two plates 20, 21 serve to absorbing the pressure exerted by filtered or backflushed melt, and the perforations provided in the two plates 20, 21 are large enough that they do not substantially interfere with the flow of melt supplied or of the filtrate. The perforated support plate 20 and the perforated backflushing plate 21 are arcuate, the convex side being upstream during filtering procedure. To each sieving section 16, a connection channel 23 is assigned through which melt supplied from the distribution space 7 may flow to the corresponding sieving section 16. As is shown in FIG. 2, all connection channels 23 are between both front ends of the distribution space 7 defined by the cylindrical portions 10, 11 of the control body 9, and also between the orifices 55 of the guide channels 6 into the distribution space 7 so that all connection channels 23 serving for filtering are always flown through from the front ends of the distribution space 7. Under this flow condition, the melt, supplied by the guide channels 6, passes the cross-pieces 14. This has the advantage that no dead regions can develop in the distribute on space 7 wherein plastic material can dwell for a prolonged period without moving, thus being liable to be thermally damaged. In an extreme case, the outermost connection channels 23, i.e. the connection channels 23 situated in the array of connection channels 23 at both ends of this array, may be opposite the two guide channels 6 so that these two guide channels 6 are located in the region of the outermost connection channels 23.

In filtering position, the control body 9 of the rotary piston 8 is caused by a device merely schematically illustrated to assume such a rotary position that none of the cross-pieces 14, which are offset relative to each other in circumferential and longitudinal direction of the rotary piston 8, is opposite to one of the connection channels 23. Therefore, the melt to be filtered is able to flow unimpededly from the whole distribution space 7 into all connection channels 23 and, thus, to the sieving sections 16 which are behind. The sieving layer 22 of each sieving section 16 retains impurities, the filtrate reaches a collection space 25 behind all sieving sections 16, and flows from it off the housing 1 through a discharge channel 34 in the direction of arrow 57 to a discharge opening 26.

If, however, one of the sieving sections 16 is to be flushed back, the control body 9 is turned by means of the device 24 in such a manner that the cross-piece 14 opposite the sieving section 16 to be flushed back is moved in front of the associated connection channel 23. The area engagement of the front surface of the cross-piece 14 of the wall of the borehole 12 acts as a sealing so that the flow of melt to be filtered is blocked for the corresponding connection channel 23. However, this connection channel 23 is moved into communication with a flush back channel 27 passing through the cross-piece 14 and extending radially or obliquely (FIG. 2) within the rotary piston 8. All flush back channels 27 discharge into a discharge channel 28, extending centrally along the longitudinal axis 13 of the rotary piston 8, through which the mass flushed back reaches either ambient or a collection chamber not shown in the direction of arrow 29.

When flushing back a sieving section 16, the conditions mentioned above remain unchanged for all other sieving sections, i.e. these other sieving sections 16 will continue to filter, and only for the sieving section to be flushed back, the associated connection channel 23 will be closed by the cross-piece situated in front of it with respect to the incoming material to be filtered from the distribution space 7. For the sieving section 16 to be flushed back, purified filtrate from the collection space 25 flows through the perforate supporting plate 20, and in reverse direction, as compared with the filtering procedure, through the sieving layer 22 and entrains therefrom the accumulated impurities which will be discharged from the sieving section 16 flushed back through the perforations of the perforated backflushing plate 21 and will be directed through the respective connection channel 23 into the flush back channel 27 and from it into the discharge channel 28. Therefore, no backflushed material will reach the distribution space 7.

In order to be able to perform the flushing back procedure just described for each individual sieving section 16, independently from the other sieving sections, the cross-pieces 14 at the circumference of the rotary piston 8 are offset relative to each other both in longitudinal direction and in circumferential direction so that one respective cross-piece 14 may be moved into sealing engagement with that wall portion of the borehole 12 which surrounds the connection channel 23, while the other cross-pieces 14 are far enough from their associated connection channels 23 that the flow of the mass to be filtered into these connection channels 23 is not disturbed.

As shown, the sieve carrier 2 has not necessarily to be moved for backflushing. This is advantageous, because in this way the sieve carrier does not wear off for backflushing, and no burnt or decomposed melt particles can possibly reach the already filtered melt through any gap between the housing and the discharge channel in the sieve carrier. However, the sieve carrier 2 may be displaced in direction of its longitudinal axis 19 by a device 30 merely schematically illustrated, in order to make individual or all sieving sections 16 in the housing 1 accessible so that a change of any sieving section may be carried out in a simple manner. This makes it possible to form the housing for the sieve carrier 2 and the distributor 3 integral, as shown in FIGS. 1 and 2. An alternative would be to form the housing in two pieces, the parting line 31 represented in dotted lines in FIG. 1 being arranged in such a manner that the whole sieving arrangement 17 is accessible for an exchange of any sieving section after having removed the housing 53 which contains the distributor 3. Another possibility for arranging such a parting line, thus constructively separating the two housings 1, 53, is given by the parting line 58, also shown in dotted lines in FIG. 1, which suitably passes through the connection channels 23. In both cases, it is possible to flange the housing of the control body 9 of the distributor 3 to the housing 1 of the sieve carrier 2. An embodiment with separated housings 1, 53 has the advantage that the distributor 3 and the sieve carrier 2 form constructively independent components and can be machined or exchanged independently from each other for either an exchange (e.g. when worn off) or a repair. Therefore, the distributor can form a component which may be obtained separately on the market.

It is suitable to dimension the length of the connection channels 23 as short as possible which improves the performance of backflushing.

As shown, material flows through all connection channels 23 and the whole distribution space 7 both when filtering and when flushing back. Therefore, coking or other thermal damage of the material supplied cannot occur.

The arcuate shape of the sieving arrangement 17, apart from the enlargement of the sieving surface, has also the advantage that a very high pressure can be absorbed during filtering. If desired or required, however, an additional supporting body 32 may be arranged at that side of the sieving arrangement 17 which is downstream during filtering and may conveniently be formed so as to be favorable for the flow, e.g. as a rib having an orthorhombic cross-section (FIG. 1).

In a likewise manner, it may be suitable in some cases to support the convex side of the sieving arrangement 17, in addition to the support by the partitions 18, by transverse ribs 33 in order to better absorb the pressure occurring during backflushing.

Figure 3:
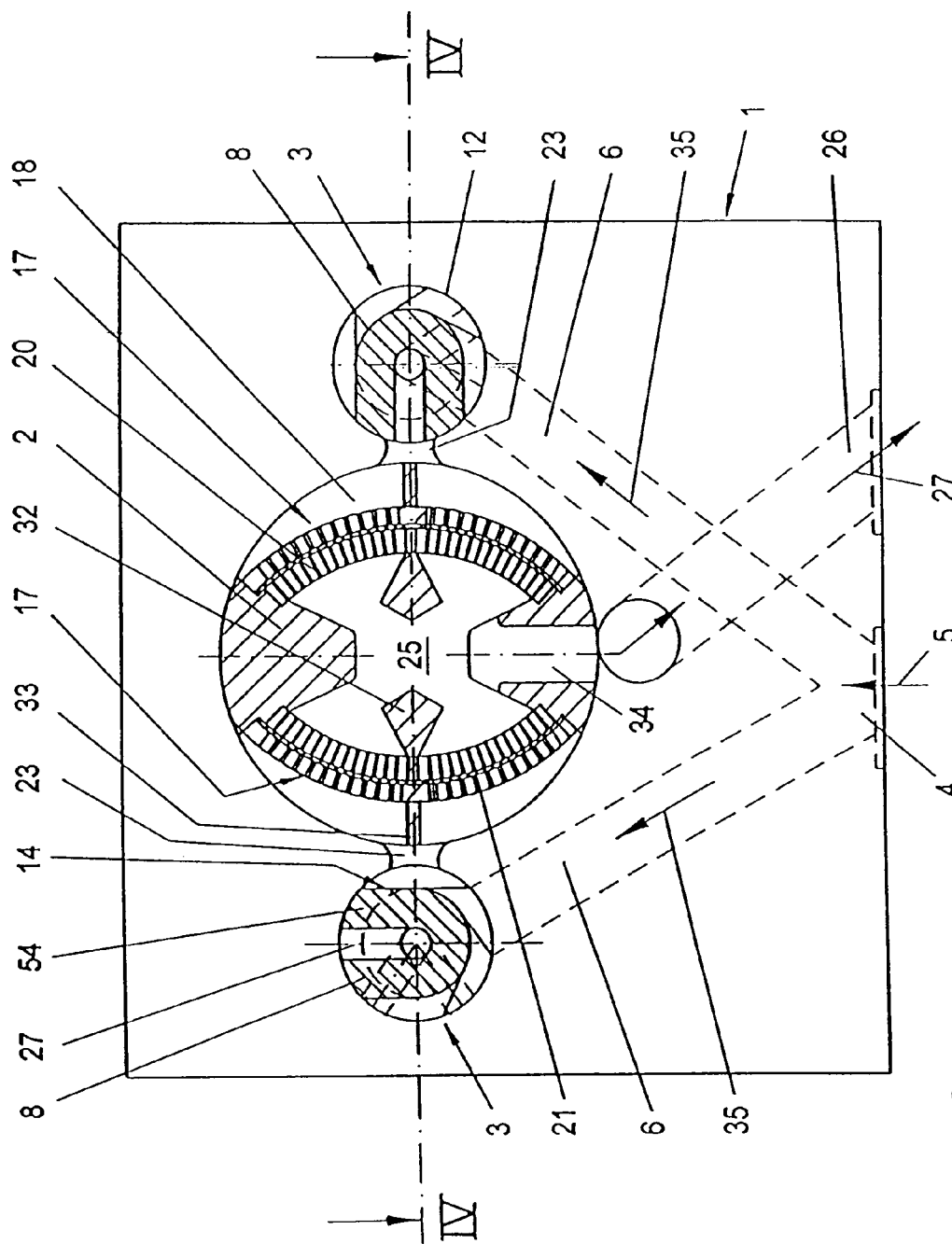
FIG. 3 shows an embodiment having two distributors as a cross-section similar to that of FIG. 1.
Figure 4:
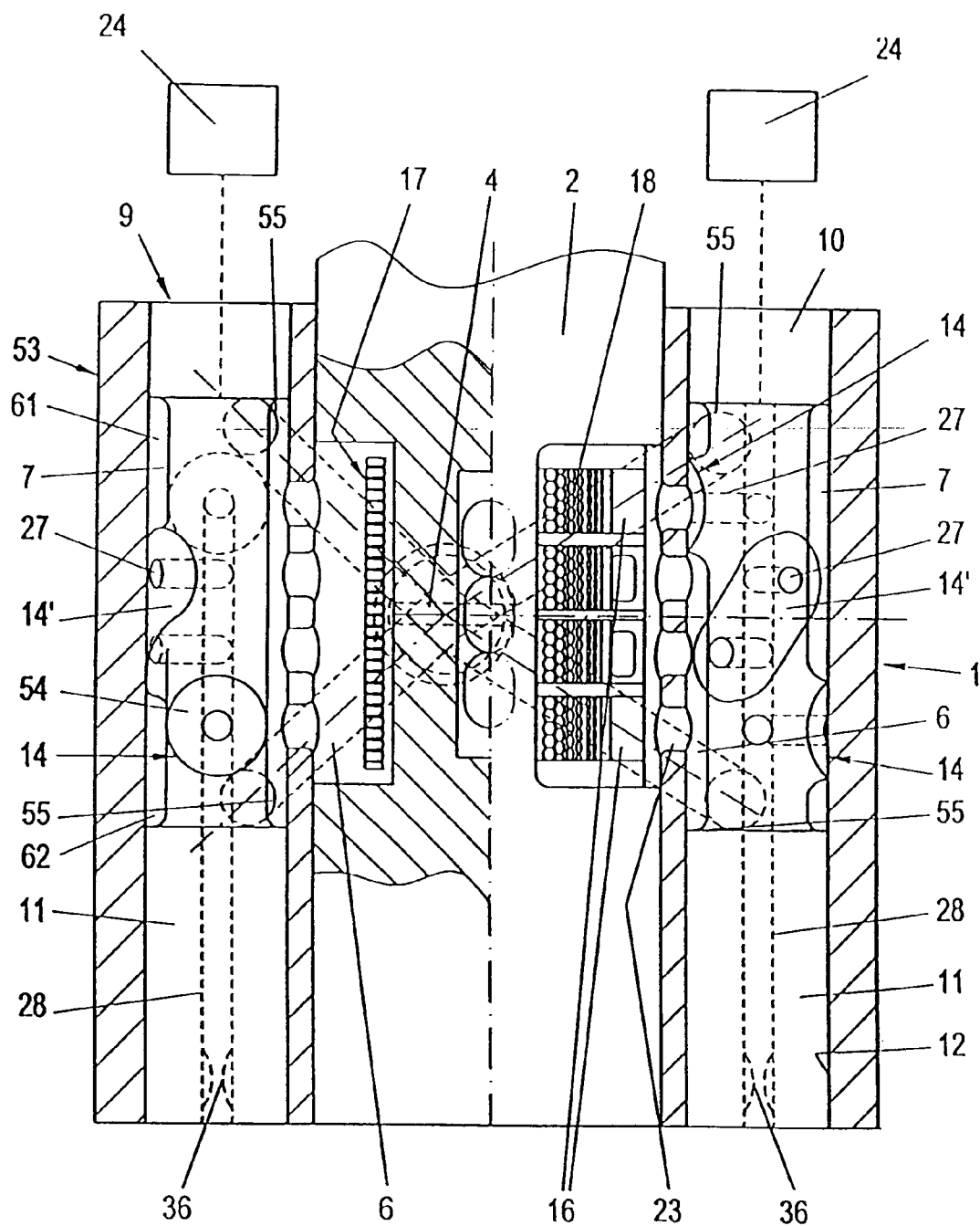
FIG. 4 is a cross-section along the line IV-IV of FIG. 3.

The embodiment according to FIGS. 3 and 4 is substantially a duplication of the construction according to FIGS. 1 and 2. Accordingly, two sieving arrangements 17 are provided which are arranged in common back to back in a single sieve carrier 2, a distributor 3 being assigned to each of them. The construction of each of these sieve arrangements 17 and of each of these distributors corresponds to the constructions described with reference to FIGS. 1 and 2. The stream to each one of both distributors 3 flows via two guide channels 6. A discharge channel 34 leads from the collection space 25 being in common to both sieving arrangements 17 to a discharge opening 26 which, in contrast to the construction according to FIGS. 1 and 2, is situated at the same side of the housing 1 as the inlet opening 4. The direction of flow of the material to be filtered in the guide channels 6 is represented by arrows 35.

It may be seen in FIG. 4 that it is possible to combine the cross-pieces 14 of two adjacent back flushing channels 27 to form a single cross-piece 14'. Furthermore, it is suitable to provide a throttle 36 at the discharge end of the discharge channel 28 in order to prevent a drop in pressure within the overall system during backflushing.

As may be seen, the rotary piston 8 represented at left in FIGS. 3 and 4 is in that position in which all sieving sections 16 filter, whereas the rotary piston 8 represented at right in FIGS. 3 and 4 is in that position in which the connection channel 23 represented on the upper side of FIG. 4 is closed for filtering, the sieving section 16 assigned to this connection channel being, however, flushed back, while the mass flushed back is directed into the discharge channel 28 through the flush back channel 27 arranged in the cross-piece 14 which is in blocking position.

Figure 5:
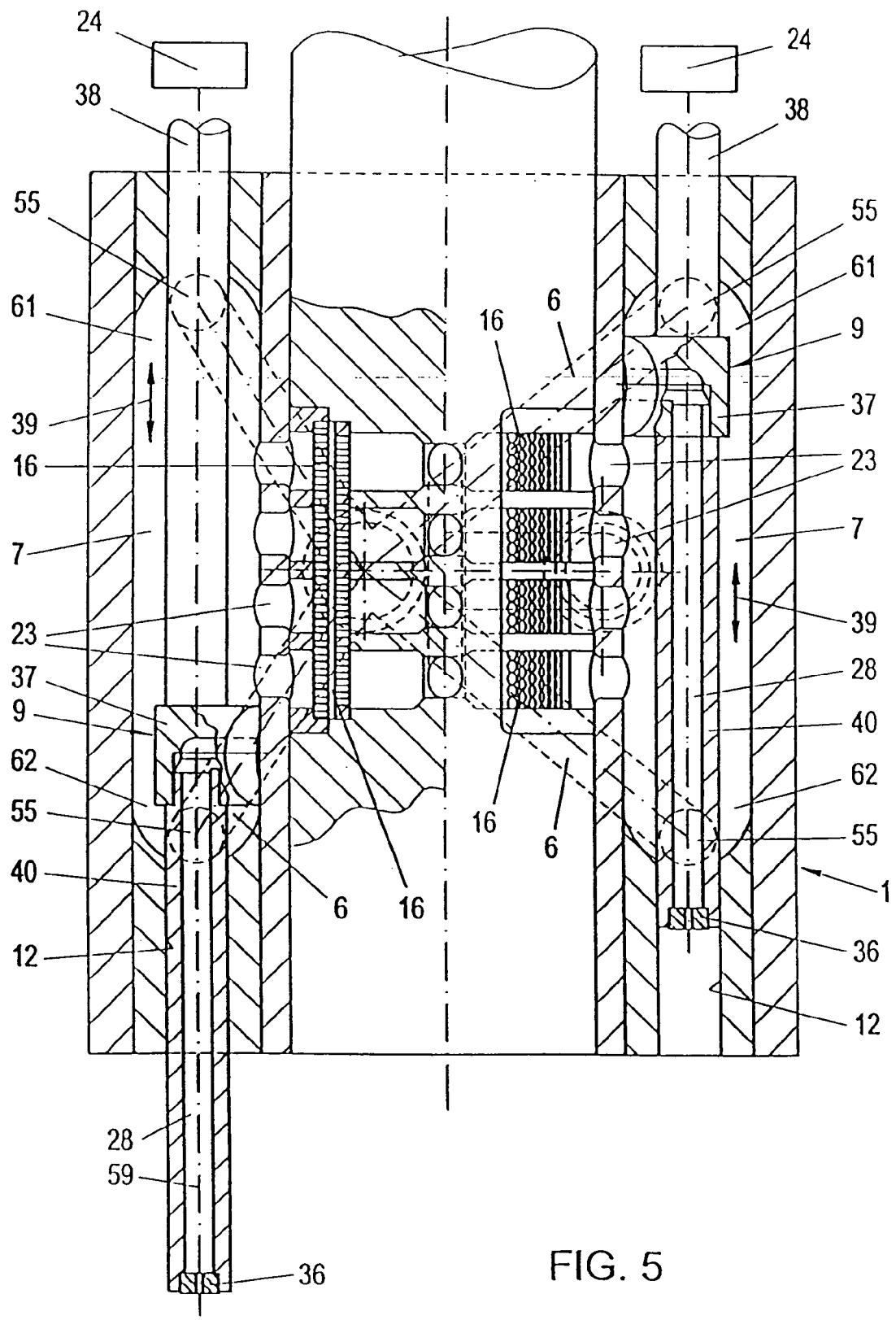
FIG. 5 shows an embodiment having two distributors formed as sliders in a cross-sectional view similar to that of FIG. 3, the two distributors being in filtering position.
Figure 6:
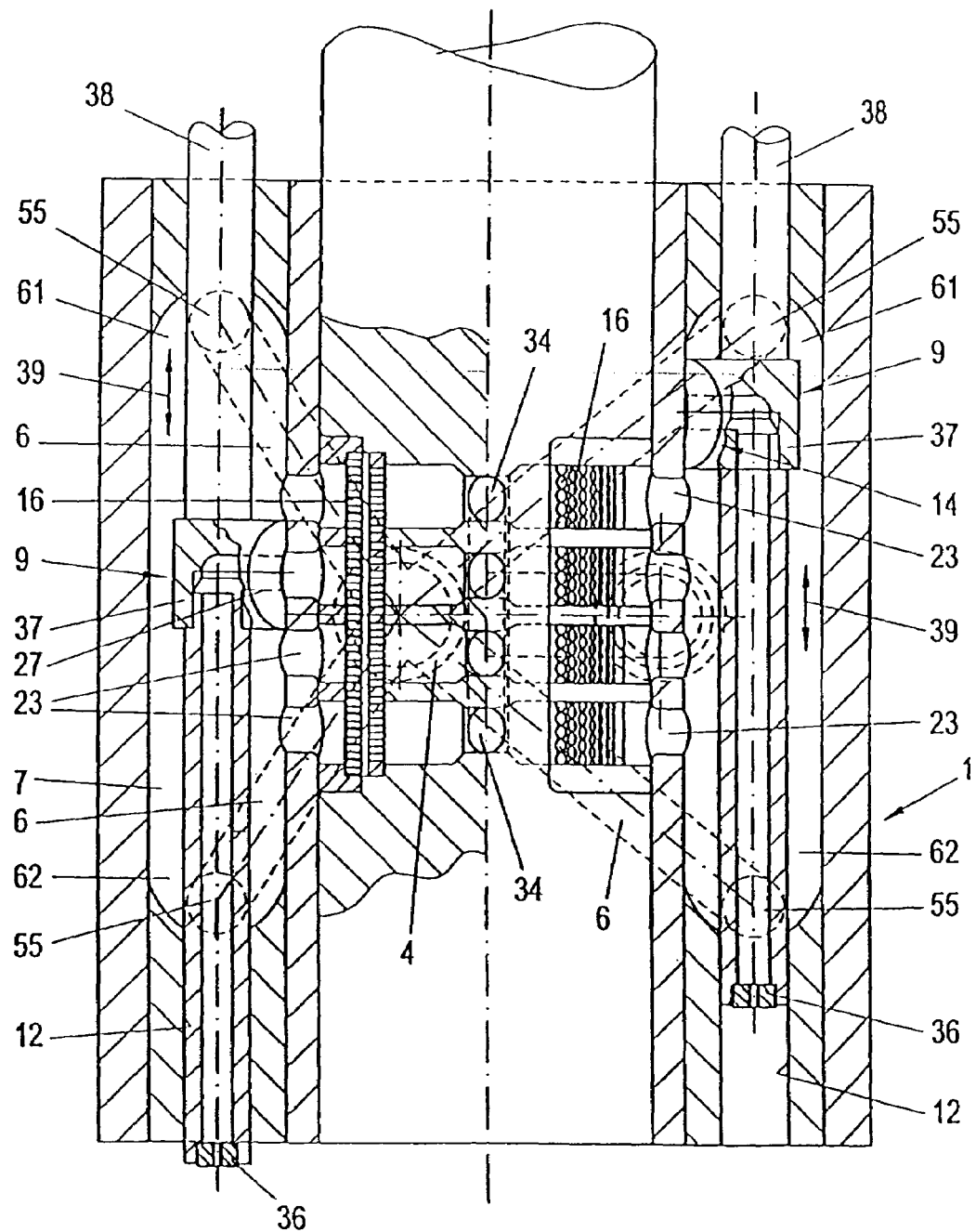
FIG. 6 shows a cross-section similar to that of FIG. 5 wherein, however, the left-side distributor is in flush back position.

The embodiment according to FIGS. 5 and 6, instead of rotary pistons as a control body 9, has sliders 37 displaceable in longitudinal direction of the distribution spaces 7 and connected to tie rods 38 which may be displaced to and fro in the direction of double arrows 39 by the devices 24. At the side opposite to the tie rods 38, each slider 37 is connected to a tube forming an elongation 40 of the slider 37 and containing in its interior the discharge channel 28, while being sealingly guided in longitudinal direction in the borehole 12. Each one of these sliders 37 may be displaced into a position in which it is outside the region of the connection channels 23, which position is represented for both sliders 37 in FIG. 5 and corresponds to the filtering position in which the influx of the mass to be filtered is unblocked to all sieving sections 16. In the operational position shown in FIG. 6, the right-hand slider 37 is also outside the region of the connection channels 23, but the left-hand slider 37 is in a position in which its flush back channel 27 is communicating with the connection channel 23 of the second sieving section 16 (when counted from the top of FIG. 6). As may be seen from FIGS. 5 and 6, the orifices 55 of the guide channels 6 into the distribution space, also in this construction, are outside the region of the connection channels 23 and outside the extreme boundary positions of the slider 37 to ensure a flow to the connection channels 23 from the exterior and to avoid dead regions.

As may be seen, the slider 37 has only to have a single cross-piece 14 for the functions described above. However, the slider 37 may also have two or more cross-pieces 14 arranged in an array, their direction coinciding with the direction of displacement of the slider 37. In this way, simultaneous backflushing of two or more sieving sections 16 is possible. Of course, it should be provided that the slider 37 as a whole, i.e. with all its cross-pieces, may then displaced into a position where it is outside of all connection channels 23 in order to ensure a simultaneous filtering position of all sieving sections 16. Moreover, it has to be made sure for a reliable function that the slider 37 cannot inadvertently be turned about its longitudinal axis 59. This can be ensured in a simple way by an appropriate cross-section of the elongation 40 and of the borehole 12 which receives this cross-section, e.g. by a rectangular cross-section.

Although the construction according to FIGS. 5 and 6 requires more space in the direction of double arrow 39, it has the advantage to enable a simpler construction of the control body 9 and, above all, has the advantage that the number of sieving sections 16 arranged side-by-side in the array is theoretically unlimited.

Figure 7:
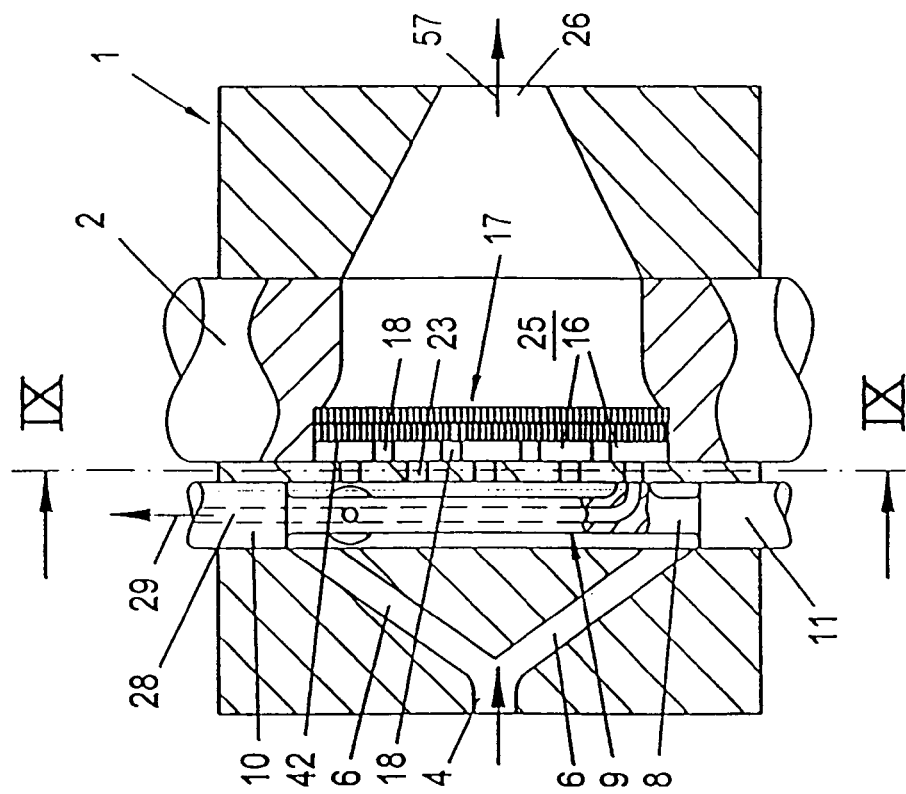
FIG. 7 shows a cross-section of an embodiment having two sieving arrangements, each of which being sub-divided in partial sieving surfaces.

The construction, that is only schematically illustrated in FIG. 7, has also a rotary piston 8 as a control body 9 which may be turned in the direction of arrow 41 about its longitudinal axis by the device 24, while its end portions 10, 11 are sealingly supported in the borehole 12. For the sake of simplicity, only two of the cross-pieces 14 of the control body 9 are represented of which the lower cross-piece 14 is in flush back position, whereas the upper cross-piece 14 unblocks the path of the mass to be filtered from the distribution space 7 into the opposite connection channel 23. The difference to the constructions described up to now is that the sieving sections 16 are distributed onto two sieving arrangements 17, each of which being in a sieve nest 42, and the two sieve nests 42 being spaced and offset to each other in the direction of the longitudinal axis of the distribution space 7. The filtrate is discharged from both filtering arrangements 17 through a discharge channel 34 each, these two channels 34 combining in the discharge opening 26.

Figure 8:
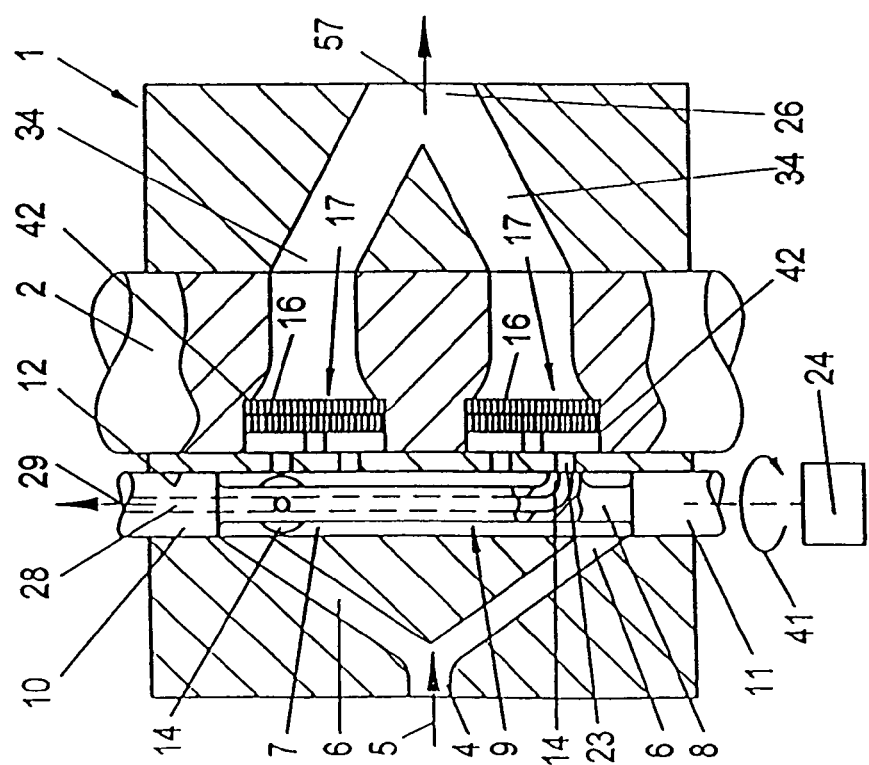
FIG. 8 shows a cross-section, similar to that of FIG. 7, of a variant having a single sieving arrangement which is sub-divided into five partial sieving surfaces which may be flushed back independently from one another.
Figure 9:
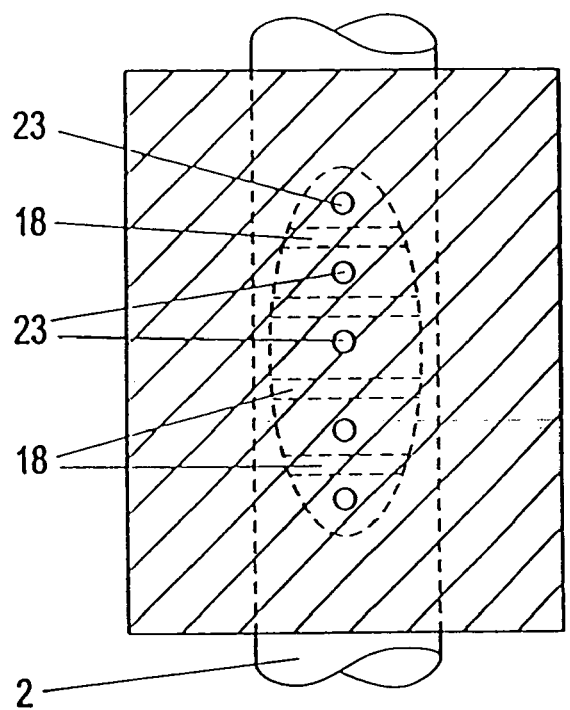
FIG. 9 shows a cross-section along the line IX-IX of FIG. 8.

In the embodiment according to FIGS. 8 and 9, there is also a rotary piston 8 as a control body 8 whose construction and arrangement is similar to that of FIG. 7. The difference to FIG. 7 is, however, that the sieve carrier 2 has only a single sieve nest 42 in which a sieving arrangement 17 sub-divided into a plurality of sieving sections 16 is located. The sieving sections 16 are separated from one another by partitions 18, thus being separately flown through and flushed back. The partitions 18 extend parallel to each other from side wall to side wall of the sieve nest 42 and, at the same time, form a support of the sieving arrangement 17 in backflushing direction. It may be seen that the connection channels 23 are suitably arranged in such a manner that they are respectively centered with respect to the sieving section 16 supplied by the respective connection channel 23 in order to ensure as uniform an influx onto the whole active surface of the sieving section 16 as possible.

Figure 10:
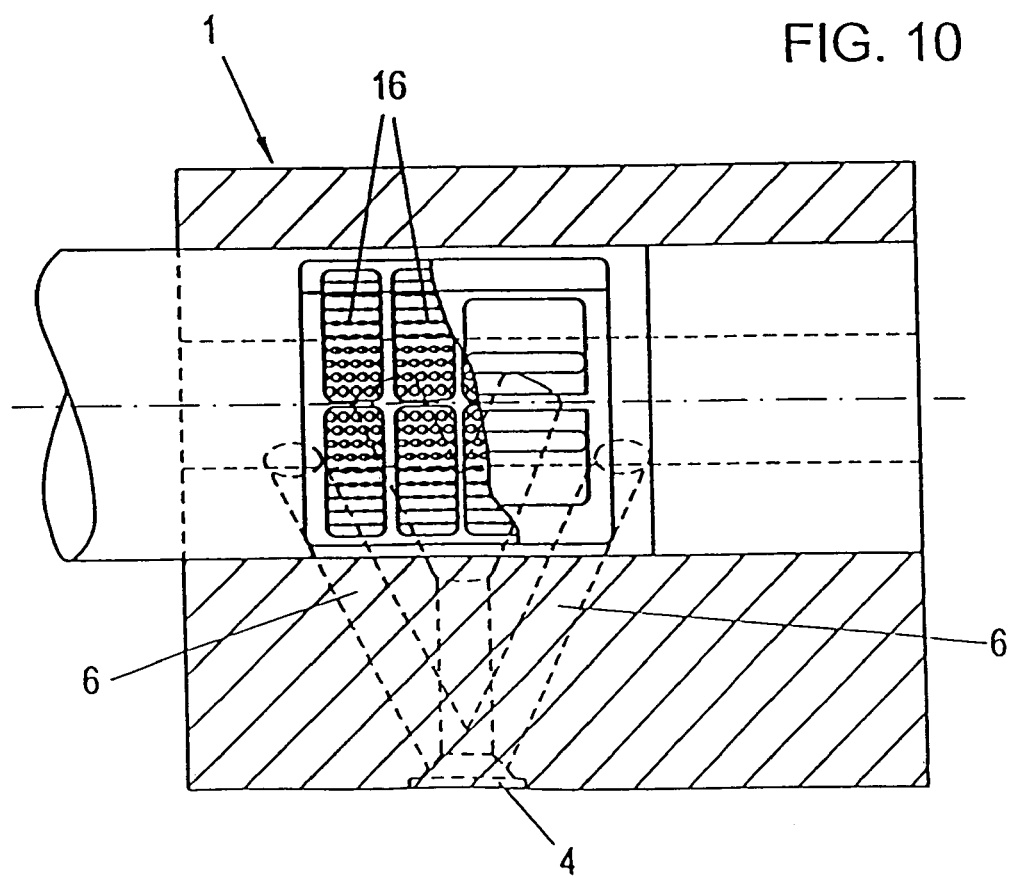
FIG. 10 shows an embodiment comprising partial sieving surfaces which are formed as a rectangle.

FIG. 10 shows that the individual sieving sections are not necessarily circular or formed of circular segments. To the contrary, the invention offers the possibility to shape the sieving sections as a rectangle or square which results in the advantage of an enlarged active sieving surface and a more uniform flow through, as compared with circular segments. The corners of a rectangular or square sieving section may be rounded in order to avoid dead angles for the flow.

Of course, in all embodiments, more than one sieve carrier may be provided, and on each sieve carrier a plurality of sieve nests may be arranged, the number of sieving sections per sieve nest theoretically being also unlimited.

Figure 11:
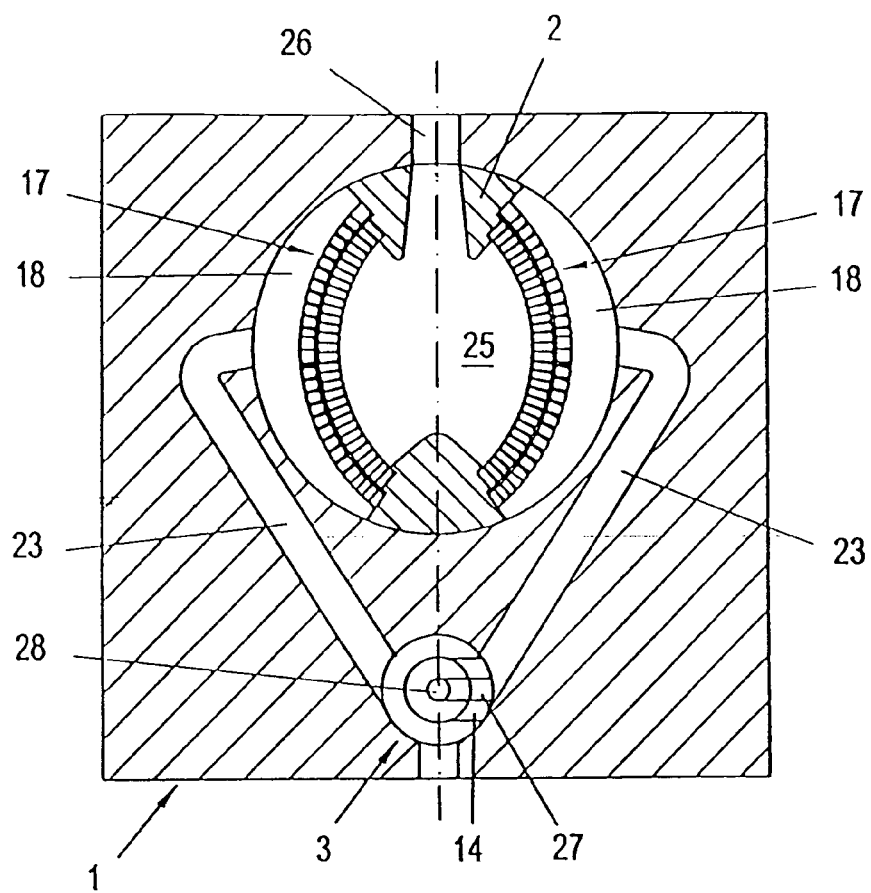
FIG. 11 shows schematically an embodiment wherein a single distributor is associated to two opposite sieving arrangements.

FIG. 11 shows a variant in which two sieving arrangements 17, being opposite to each other and arranged back to back in the sieve carrier 2, are supplied with the material to be filtered by a distributor 3 in common via the connection channels 23 and are backflushed over the same connection channels 23. As compared to the embodiments described up to now, this variant has the advantage of a smaller and more space saving construction, but requires longer connection channels 23.

Figure 12:
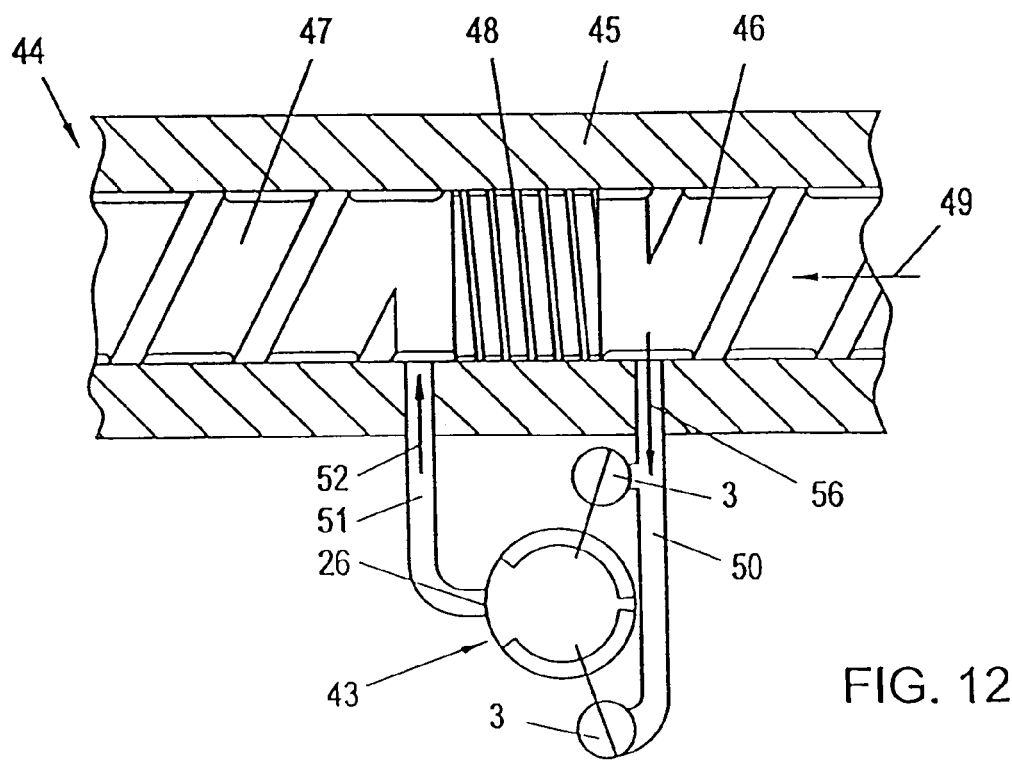
FIG. 12 shows schematically the combination of a filtering apparatus and a device for plastifying and agglomerating plastic material.

FIG. 12 shows the combination of a backflushable filtering apparatus 43 according to the invention, and a device 44 for plastifying or agglomerating plastic material. This device 44 comprises a housing 45 wherein two screw portions 46, 47 are supported interconnected by still another screw portion 48 situated between them and acting as a sealing means, the conveying direction of this portion being opposite to the conveying direction of the screw portions 46, 47 indicated by an arrow 49. In this way, the thermoplastic material conveyed by the screw portion 46 is forced to flow through an opening of the wall of the housing 45 in the direction of the arrow 56 to the distributor 3 of the filtering apparatus 43 via a channel 50. From its discharge opening 26, the filtrate flows in the direction of arrow 52 through a channel 51 into another opening of the wall of the housing 45 and flows, thus, back to the screw position 47, postponed in conveying direction, which conveys the filtered plastic material to an extruder nozzle or any other outlet.

The sieve carrier 2 is not necessarily a piston having a circular cross-section. To the contrary, it may in many cases be favorable to form the sieve carrier 2 as a flat slider, e.g. having a rectangular cross-section, which prevents in a simple manner any undesired rotation of the sieve carrier 2 about its longitudinal axis.

Figure 13:
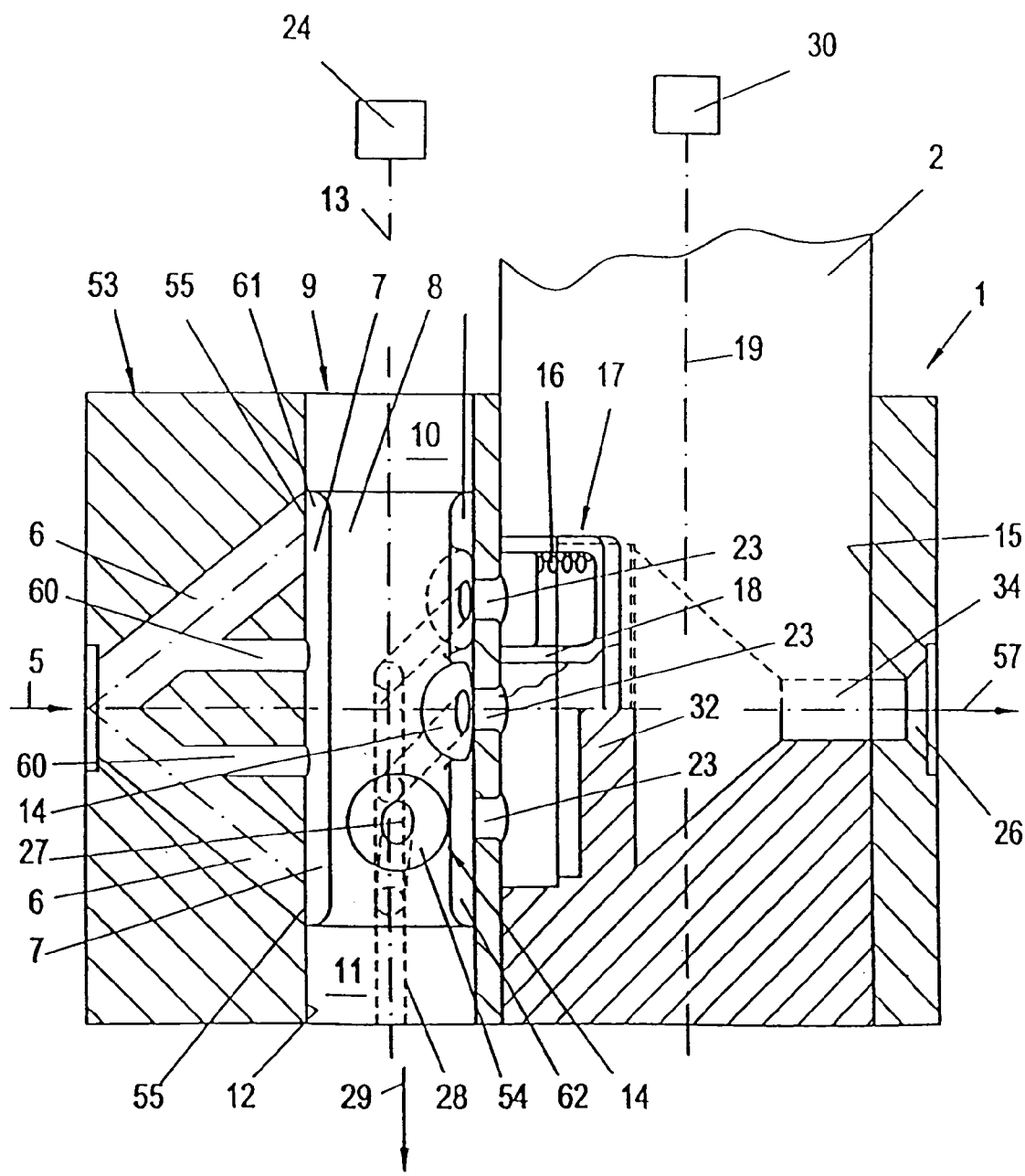
FIG. 13 shows an embodiment having additional guide channels.

Within the embodiment according to FIG. 13, which is similar to that of FIG. 2, additional guiding channels 16 are provided which branch off the two guide channels 6 leading to the front ends 61, 62 of the distribution space 7 which is disposed between these two front ends 61, 62. These additional guide channels 60, suitably, have a smaller cross section than the guide channels 6, and, of course, they are so disposed that, when the rotary piston 8 is rotated, there is no direct connection to the backflushing channels 27. These additional guide channels 60 offer an advantage in distributing the supplied melt fluid to the centrally disposed sieving sections 16 and, in general, with respect to an improvement of the flow characteristics. This embodiment, therefore, is particularly suitable for constructions in which a plurality of sieving sections 16 are disposed side by side in axial direction of the sieve carrier 2.

Figure 14:
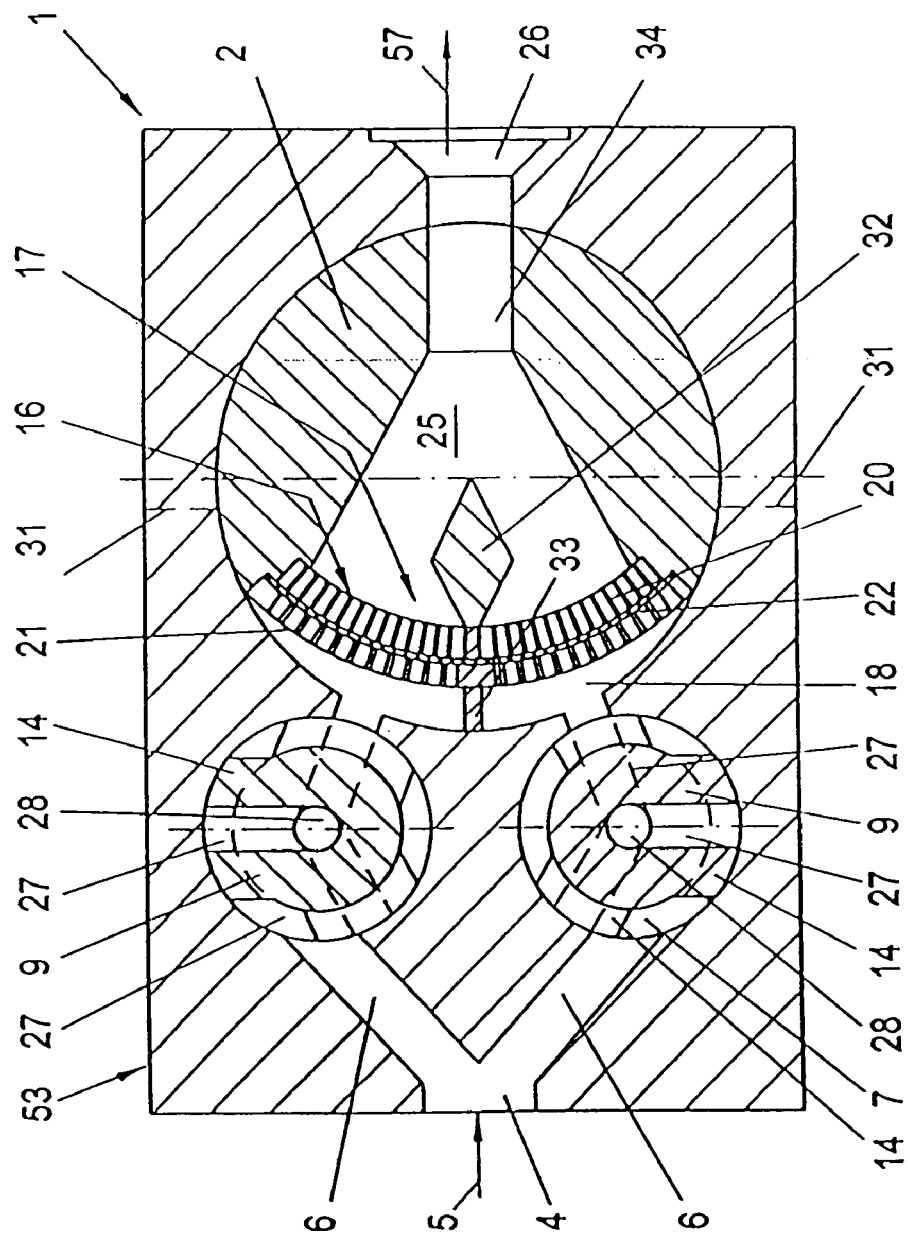
FIG. 14 shows an embodiment having two control bodies.

The embodiment according to FIG. 14 differs from that according to FIG. 1 in that two control bodies 9 are disposed within a common housing 53. An own distribution space 7 is assigned to each one of these control bodies 9, wherein the construction of each control body 9 corresponds to the construction described in connection with FIG. 1. Each distribution space 7 is supplied on its both front ends via the guide channels 6. This embodiment has the advantage of still shorter backflushing distances for the impurity particles to be flushed off, and further the volume of clean melt necessary for the backflushing process is decreased. Within this, the transverse ribs 33 are suitable for additional subdividing the sieving arrangement 17 into several sieving sections 16 to which the distributors 9 are assigned.

Of course, it is also possible to assign to each control body an own housing and, if desired, to supply via more than one inlet opening 4.

The invention claimed is:

1. Backflushable filtering apparatus for a molten material, particularly for a plastic melt, comprising a housing (1) in which a sieving arrangement (17) is provided which includes at least two sieving sections (16) separated from one another, to which the melt to be filtered is supplied via at least one distributor (3) which includes at least one control body (9) for backflushing, moveable within a housing (53) that is provided with an inlet opening (4) for the material to be filtered, said control body, in a filtering position, unblocking the influx of material to be filtered to all sieving sections (16) through connection channels (23), while in a backflushing position interrupting the influx of material to the filtering section (16) to be backflushed and interconnecting the connection channel (23) of the sieving section (16) flushed back with a discharge channel (28) located in the control body (9) and leading away from it, at least the majority of the circumference of the control body (9) being surrounded by a distribution space (7) for the material to be filtered which is situated within the housing (53) of the distributor (3), said distribution space (7) being connectable through the connection channels (23) to all sieving sections (16) in communication with the distributor (3), characterized in that guiding channels (6) lead from the inlet opening (4) to the regions of the two front ends (61, 62) of the distribution space (7), that said front ends (61, 62) are situated in the region of the outermost connection channels (23) or outside the region of all connection channels (23), and that the discharge channel (28) may be caused to communicate with the connection channel (23) of the respective sieving section (16) to be flushed back through a flush back channel (27) of at least one cross-piece (14) of the control body (9) which overbridges the distribution space (7).

2. Apparatus according to claim 1, characterized in
   that the control body (9) is a slider (37) displaceable in the housing (53), that surrounds it, and
   that the connection channels (23) leading to the individual sieving sections (16) are offset relative to each other in sliding direction of the slider (37).

3. Apparatus according to claim 1, characterized in that the control body (9) is a rotary piston (8), rotatable about its longitudinal axis (13) within its housing (53), which is supported in a sealed manner at its two front ends (10), (11) in its housing (53), but is surrounded in-between by the distribution space (7).

4. Apparatus according to claim 1, characterized in that the connection channels (23) extend only in the housing (53), which surrounds the control body, and that sieve nests

(42) of the housing (1) of the filtering apparatus, which contain the sieving sections (16), immediately join the outer surface of the housing (53) of the control body (9) within the region of the respective orifice of a connection channel (23).

5. Apparatus according to claim 1, characterized in that the sieving arrangements (17) are located in a sieve carrier (2) in common.

6. Apparatus according to claim 1, characterized in that the housing (1) of the filtering apparatus (43) and the housing (53) of the control body (9) are united to form a housing in common.

7. Apparatus according to claim 1, characterized in that the sieving arrangement (17) comprises a plurality of sieving sections (16) arranged in at least one array, the orientation of which being parallel to the longitudinal direction of the distribution space (7).

8. Apparatus according to claim 1, characterized in that a sieve carrier (2) may be moved relative to the housing (1) into a sieve exchange position.

9. Apparatus according to claim 1, characterized in
that the control body (9) is elongated or is provided with an elongated elongation (40), and
that the discharge channel (28) extends in longitudinal direction of the control body (9) or of the elongation (40) up to ambient or into a collection chamber for dirty material.

10. Apparatus according to claim 9, characterized in that a throttle (36) is provided at the discharge end of the discharge channel (28).

11. Apparatus according to claim 1, characterized in that at least one sieve carrier (2) formed either as a piston or as a flat slider is provided, each sieve carrier (2) carrying at least two sieving sections (16).

12. Apparatus according to claim 11, characterized in that each sieving section (16) comprises a perforated support plate (20) and a perforated backflushing plate (21) and at least one sieving layer (22) in-between.

13. Apparatus according to claim 12, characterized in that at least one sieving section (16) is separated from the adjacent sieving section (16) by a partition (18) arranged upstream in filtering position, and a connection channel (23) leads to each one of the sieving sections (16) which, preferably, discharges centrally relative to the sieving section (16).

14. Apparatus according to claim 12, characterized in that the perforated support plate (20) and the perforated backflushing plate (21) are arcuate, the convex side being upstream in filtering position.

15. Apparatus according to claim 12, characterized in that the perforated support plate (20) is supported by at least one supporting body (32) against the sieve carrier.

16. Apparatus according to claim 1, characterized in that at least one sieving section (16) comprises a rectangular or square sieving surface, optionally with rounded corners.

17. Apparatus according to claim 1, characterized in that each cross-piece (14) of the control body (9) is formed by a knob-like salient (54) of the outer surface of the control body (9) which surrounds a flush back channel (27) connectable to the connection channel (23) and sealingly engages an area of the wall of the housing (53) of the control body (9).

18. Apparatus according to claim 17, characterized in that a plurality of salients (54), that overbridge the distribution space (7), are provided on the control body (9) offset relative to each other both in longitudinal direction of the control body (9) and in its circumferential direction, a flush back channel (27) being arranged in each salient (54).

19. Apparatus according to claim 18, characterized in that two flush back channels (27) adjacent to each other are surrounded in common by a salient (54).

20. Apparatus according to claim 1, characterised in that at least one additional guiding channel (60) leads into the distribution space (7) between the two guiding channels (6) leading to the front ends (61, 62) of the distribution space (7).

21. Apparatus according to claim 1, characterised in that at least two control bodies (9) are provided within a common housing (53), each one of which is supplied via guiding channels (6) in the region of the front ends (61, 62) of its distribution space (7).

* * * * *